United States Patent
Kim et al.

(10) Patent No.: US 9,065,562 B2
(45) Date of Patent: Jun. 23, 2015

(54) METHOD AND DEVICE FOR DETERMINING OUTPUT OF VISIBLE FRAME IN VISIBLE LIGHT COMMUNICATION SYSTEM

(75) Inventors: Do-Young Kim, Yongin-si (KR); Hwa-Joong Kim, Uiwang-si (KR); Clint F. Chaplin, San Jose, CA (US); Sun-Gi Gu, Yongin-si (KR); Eun-Tae Won, Seoul (KR); Young-Kwon Cho, Suwon-si (KR); Tae-Han Bae, Seoul (KR); Jae-Seung Son, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 224 days.

(21) Appl. No.: 13/508,498

(22) PCT Filed: Jul. 26, 2010

(86) PCT No.: PCT/KR2010/004898
§ 371 (c)(1),
(2), (4) Date: May 7, 2012

(87) PCT Pub. No.: WO2011/055895
PCT Pub. Date: May 12, 2011

(65) Prior Publication Data
US 2012/0224860 A1 Sep. 6, 2012

(30) Foreign Application Priority Data

Nov. 6, 2009 (KR) .................. 10-2009-0107239
Dec. 23, 2009 (KR) .................. 10-2009-0130167

(51) Int. Cl.
*H04B 10/114* (2013.01)
*H04B 10/116* (2013.01)

(52) U.S. Cl.
CPC .......... *H04B 10/1149* (2013.01); *H04B 10/116* (2013.01)

(58) Field of Classification Search
USPC ......... 398/118, 120, 127, 128, 129, 130, 131, 398/172
See application file for complete search history.

(56) References Cited

U.S. PATENT DOCUMENTS

| 5,619,361 A * | 4/1997 | Sagesaka et al. ............. 398/127 |
| 2006/0062099 A1* | 3/2006 | Yazaki et al. ............. 369/44.11 |
| 2009/0010654 A1 | 1/2009 | Shin et al. |
| 2009/0022496 A1* | 1/2009 | Shin et al. ..................... 398/118 |

(Continued)

FOREIGN PATENT DOCUMENTS

| JP | 2006-067333 | 3/2006 |
| JP | 2007-324672 | 12/2007 |

(Continued)

OTHER PUBLICATIONS

PCT/ISA/237 Written Opinion issued on PCT/KR2010/004898 (pp. 4).

(Continued)

*Primary Examiner* — Shi K Li
*Assistant Examiner* — Mina Shalaby
(74) *Attorney, Agent, or Firm* — The Farrell Law Firm, P.C.

(57) ABSTRACT

A method and device for determining an output of a visible frame in at Visible Light Communication (VLC) device are provided. A first VLC device determines whether to permit a second VLC device to generate visible frames, and transmits, to the second VLC device, visible frame information indicating whether the second VLC device is permitted to generate the visible frames.

14 Claims, 20 Drawing Sheets

(56) References Cited

U.S. PATENT DOCUMENTS

2009/0028558 A1    1/2009    Choi et al.
2009/0185802 A1*   7/2009    Choi et al. ..................... 398/25

FOREIGN PATENT DOCUMENTS

KR    1020080108732    12/2008
WO   WO2009104921    8/2009

OTHER PUBLICATIONS

PCT/ISA/210 Search Report issued on PCT/KR2010/004898 (pp. 3).
Sridhar Rajagopal et al., "IEEE 802.15.7 VLC PHY/MAC Proposal—Samsung/ETRI", IEEE 802.15 Working Group for Wireless Personal Area Networks, Oct. 31, 2009.

* cited by examiner

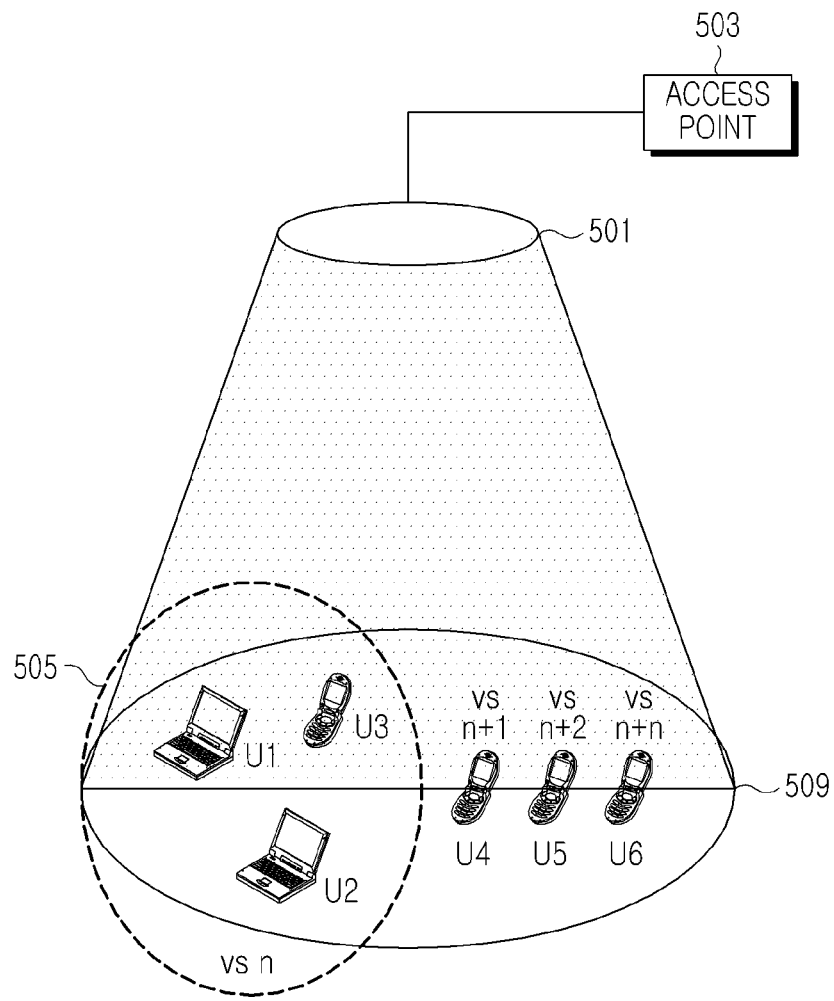
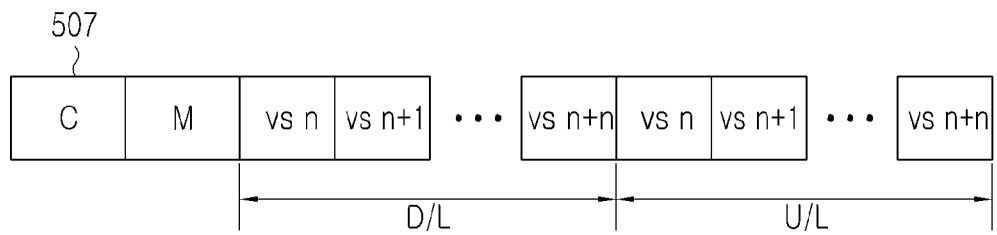
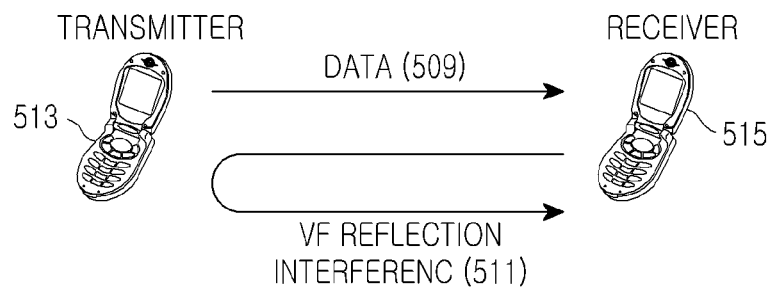
FIG.7

| bit | VISIBLE FRAME PATTERN | BRIGHTNESS | APPLICATION MODE |
|---|---|---|---|
| 0110 0100 | 1111 11111 | 100% | P2P |
| 0101 1010 | 11110 11111 | 90% | P2P |
| 0101 0000 | 11110 11110 | 80% | MULTI-TERMINAL COMMUNICATION |
| 0100 0110 | 11101 11100 | 70% | MULTI-TERMINAL COMMUNICATION |
| 0011 1100 | 11001 11100 | 60% | MULTI-TERMINAL COMMUNICATION |
| 0011 0010 | 10001 11100 | 50% | MULTI-TERMINAL COMMUNICATION |
| 0010 1000 | 00001 11100 | 40% | MULTI-TERMINAL COMMUNICATION |
| 0001 1110 | 00001 11000 | 30% | MULTI-TERMINAL COMMUNICATION |
| 0001 0100 | 00001 10000 | 20% | MULTI-TERMINAL COMMUNICATION |
| 0000 1010 | 00001 00000 | 10% | MULTI-TERMINAL COMMUNICATION |
| 0000 0000 | 00000 00000 | 0% | MULTI-TERMINAL COMMUNICATION |

FIG.12

| Field name | Size(bit) | Description |
|---|---|---|
| Transmitter ID | 8 | Transmitter ID |
| Receiver ID | 8 | Receiver ID |
| Frame type | 4 | 0: Data frame<br>1: Visible frame<br>2-15: reserved |
| Data rate | 4 | 0: 120Mbps<br>1-15: reserved |
| Frame length | 32 | Length of Data or Visible Frame |
| Visible frame pattern | 8 | 0110 0100(100) : 11111 11111<br>0101 1010 (90): 11110 11111<br>0101 0000 (80): 11110 11110<br>0100 0110 (70): 11101 11100<br>0011 1100 (60): 11001 11100<br>0011 0010 (50): 10001 11100<br>0010 1000 (40): 00001 11100<br>0001 1110 (30): 00001 11000<br>0001 0100 (20): 00001 10000<br>0000 1010 (10): 00001 00000<br>0000 0000 (0): 00000 00000<br>101~255 : reserved |
| VF info type | 1 | 1: VF transmission<br>0: Non VF transmission (VF off) |
| Ack/Nack | 4 | 0: No Ack/Nack<br>1: Nack<br>2: Ack<br>3-15: reserved |
| Control header CRC | 16 | 16-bit CRC of the Control Header from the Transmitter ID field through the Ack/Nack field |
| Reserved | 3 | reserved for another usage |

FIG.14  VISIBLE FRAME TRANSMISSION SCHEME

| Field Name | Size (bits) | Description |
|---|---|---|
| Transmitter ID | 8 | Transmitter ID |
| Receiver ID | 8 | Receiver ID |
| Frame Type | 4 | 0: Data frame<br>1: Visible frame<br>2-15: reserved |
| Data Rate | 4 | 0: 120Mbps<br>1-15: reserved |
| Frame Length | 32 | Length of Data or Visible Frame |
| Visible Frame Percent | 8 | For Data Frames the value shall be 0.<br>For Visible Frames:<br>0-100: Visible Frame intensity in percent<br>101-255: reserved |
| Ack/Nack | 4 | 0: No Ack/Nack<br>1: Nack<br>2: Ack<br>3-15: reserved |
| VF info type | 1 | Visible Frame transmission<br>1 : Receiver VF transmission<br>0 : Non receiver VF transmission(do not use VF in receiver) |
| reserved | 3 | |
| MAC Management Message | 8 | See 9.2.2.1 |
| Control Header CRC | 16 | 16-bit CRC of the Control Header from the Transmitter ID field through the MAC Management Message field; see 9.5 for the specification of the 16-bit CRC. The receiver shall calculate the 16-bit CRC upon reception and compare the result to the value in this field; if the comparison fails the entire frame shall be discarded. |

FIG.15

| Field name | Size(bit) | Description |
|---|---|---|
| Transmitter ID | 8 | |
| MS ID | 10 | |
| Frame type | 4 | |
| Data rate | 4 | |
| Frame length | 32 | |
| Visible frame length | 8 | |
| Ack/Nack | 4 | |
| VF info type | 1 | |
| MAC management message | 8 | |
| CRC | 16 | |

FIG.16

| Field name | Size(bit) | Description |
|---|---|---|
| Reciever ID | 8 | |
| MS ID | 10 | |
| Ack/Nack | 4 | |
| CRC | 16 | |

FIG.17

| Management payload field | bit | usage |
|---|---|---|
| Src_multi_info | 5 bit | Source multi channel information |
| Des_multi_info | 5 bit | Destination multi channel information |
| H_pattern | 5 bit | Hopping pattern |
| VF_info | 2 bit | Visible frame information |
| Src_mode | 3 bit | Source mode |
| G_cell_ID | 10 bit | Definition of cell size |
| Fractional_Src | 2 bit | 1: yes (fractional cell configuration)<br>0 : no (general cell configuration) |
| Frame length | 32 | Length of Data or Visible Frame |
| Visible frame pattern | 8 | 0110 0100 : 11111 11111<br>0101 1010 : 11110 11111<br>0101 0000 : 11110 11110<br>0100 0110 : 11101 11100<br>0011 1100 : 11001 11100<br>0011 0010 : 10001 11100<br>0010 1000 : 00001 11100<br>0001 1110 : 00001 11000<br>0001 0100 : 00001 10000<br>0000 1010 : 00001 00000<br>0000 0000 : 00000 00000<br>101~255 : reserved |
| VF info type | 1 | 1: VF transmission<br>0:Non VF transmission (VF off) |
| Mode_type | 2 bit | Mode type |
| S_Release_slot | 5 bit | Slot release |
| MS_ID | 10 bit | Mobile Station ID |
| # of time slot | 5 bit | Number of time slot |
| Cell_info | 10 bit | Cell ID and optical source ID<br>(ex Cell n_ID_n) |
| B_info | 2 bit | Cell boundary alarm information |
| S_info | 5 bit | virtual time slot assignment information |

FIG.18

METHOD AND DEVICE FOR DETERMINING OUTPUT OF VISIBLE FRAME IN VISIBLE LIGHT COMMUNICATION SYSTEM

PRIORITY

This application is a National Phase Entry of PCT International Application No. PCT/KR2010/004898, which was filed on Jul. 26, 2010, and claims priority to Korean Patent Application Serial Nos. 10-2009-0107239 and 10-2009-0130167, which were filed in the Korean Intellectual Property Office on Nov. 6, 2009 and Dec. 23, 2009, respectively, the entire disclosure of each of which is incorporated herein by reference.

BACKGROUND OF THE INVENTION

1. Field of the Invention

The present invention relates generally to a Visible Light Communication (VLC) system, and more particularly, to a method and device for determining an output of a visible frame according to a communication environment in a VLC system.

2. Description of the Related Art

With improved luminous efficiency and competitive price, Light Emitting Diodes (LEDs) are more often used in special lighting markets for mobile devices, displays, vehicles, traffic lights, advertising boards, etc., and also in general light markets for fluorescent lamps, incandescent lamps, etc. Further, due to the exhaustion of Radio Frequency (RF) band frequencies, the possibility of a conflict between various wireless communication techniques, the increased demand for communication security, the advent of ubiquitous super-high speed communication environments in a 4th Generation (4G) wireless technology, etc., there is a growing interest in an optical wireless technology complementary to an RF technology, such as VLC using LEDs.

VLC that transmits information using visible light is safe, wide in bandwidth, and free for use. In addition, VLC enables a user to accurately perceive an information reception range because the user can see a light arrival place or a light traveling direction. Accordingly, VLC is reliable in terms of security and can be driven with lower power. VLC may be applied even in hospitals and airplanes where the use of RF is limited and may provide additional information services using an electronic signboard.

FIG. 1 illustrates a conventional VLC system.

Referring to FIG. 1, the conventional VLC system includes a light source 10 and a VLC terminal 20. The light source 10, which includes LEDs or Laser Diodes (LDs), transmits and receives data using visible light. The VLC terminal 20 includes a visible light transmission/reception module for transmitting and receiving data to and from the light source 10. The VLC terminal 20 may be a mobile terminal, such as a cellular phone or a Personal Digital Assistant (PDA), or a fixed terminal such as a desktop type.

Generally, a plurality of light sources 10 are installed for VLC. When the plurality of light sources are installed at regular intervals, multiple service areas provided by the light sources.

FIGS. 2 to 4 illustrate examples of service areas provided by two light sources.

As illustrated in FIG. 2, service areas provided by light sources 30 and 40 may overlap each other.

As illustrated in FIG. 3, service areas provided by the light sources 30 and 40 may contact each other at their boundaries.

As illustrated in FIG. 4, service areas provided by the light sources 30 and 40 may be separated from each other so that a non-service area is present.

Among the examples illustrated in FIGS. 2-4, FIG. 3 illustrates an ideal state, which is difficult to achieve in reality. Generally, service areas provided by a plurality of light sources include an overlap area, as illustrated in FIG. 2, or include a non-service area, as illustrated in FIG. 4.

When providing a unicast, multicast, or broadcast communication service to multiple user terminals using VLC, the multiple user terminals may be located in a service area provided by one light source and each terminal may receive the same or individual data. Because VLC uses visible light, the transmission and reception of data can be easily performed when communication links of a transmitter and a receiver are aligned in both directions. Even in one-way communication, the communication links should be formed to accurately direct a visible light signal generated from a visible light transmitting part of the transmitter to a visible light receiving part of the receiver. Consequently, communication links for terminals that receive data from a light source are often disconnected or a visible light signal is not properly transmitted, due to external environment factors, movement of terminals, obstacles in the communication paths, etc. Even when there are a plurality of terminals that receive data from one light source, communication links may be disconnected from one of the multiple terminals.

Therefore, a need exists for a method for determining an output of a visible frame in consideration of various communication environments using VLC terminals.

A need also exists for a method for determining an output of a visible frame in consideration of a data non-transmission interval, misalignment, a Negative ACKnowledgement (NACK) signal, user selection, etc.

SUMMARY OF THE INVENTION

The present invention is designed to address at least the above-described problems and/or disadvantages and to provide at least the advantages described below.

Accordingly, an aspect of the present invention is to provide a device and method for determining an output of a visible frame in consideration of various communication environments in a VLC system.

In accordance with an aspect of the present invention, a method for determining an output of a visible frame in a first VLC device is provided. The method includes determining whether to permit a second VLC device to generate visible frames, and transmitting, to the second VLC device, visible frame information indicating whether the second VLC device is permitted to generate the visible frames.

In accordance with another aspect of the present invention, a method for determining an output of a visible frame in a second VLC device is provided. The method includes receiving, from a first VLC device, visible frame information indicating whether the second VLC device is permitted to generate visible frames, confirming the received visible frame information, and determining whether to generate the visible frames according to the visible frame information.

In accordance with another aspect of the present invention, a VLC device for generating visible frames is provided. The VLC device includes a visible light transceiver for transmitting and receiving a VLC signal, and a controller for determining whether to permit a counterpart VLC device to generate the visible frames, when the VLC operates as a transmitter, and transmitting, to the counterpart VLC device, through the visible light transceiver, visible frame information indicating whether the counterpart VLC device is permitted to generate the visible frames.

BRIEF DESCRIPTION OF THE DRAWINGS

The above and other aspects, features, and advantages of certain embodiments of the present invention will be more apparent from the following description taken in conjunction with the accompanying drawings, in which:

FIG. 7 illustrates a VLC system using virtual time slots for accommodating multiple users;

FIG. 12 illustrates visible frame patterns transmitted within a visible frame according to an embodiment of the present invention;

FIGS. 14 to 17 illustrate frame structures according to embodiments of the present invention;

FIG. 18 illustrates a frame structure according to an embodiment of the present invention;

Throughout the drawings, the same drawing reference numerals will be understood to refer to the same elements, features and structures.

DETAILED DESCRIPTION OF EMBODIMENTS OF THE INVENTION

Figure 1:
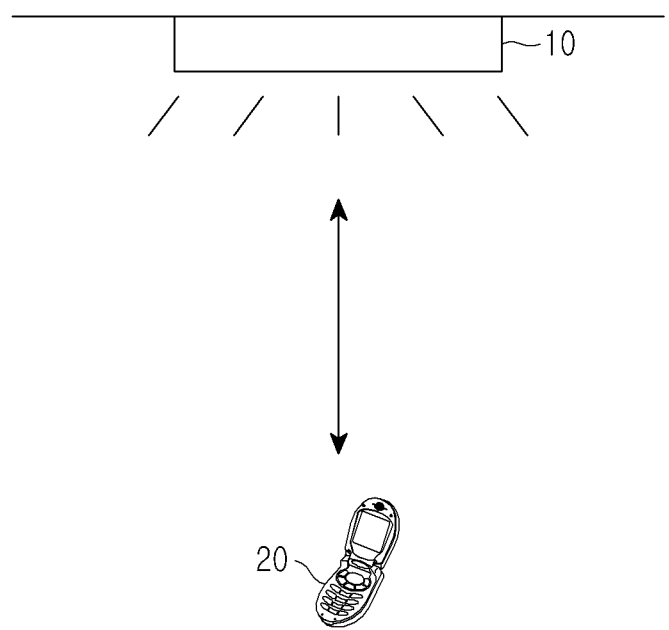
FIG. 1 illustrates a conventional VLC system.
Figure 2:
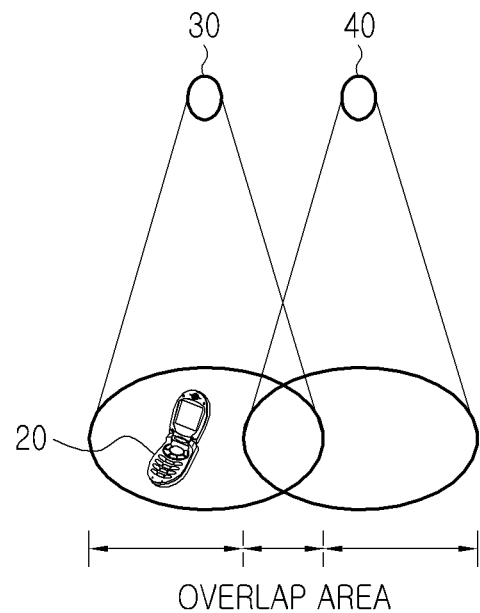
FIGS. 2 to 4 illustrate examples of service areas provided by two light sources.
Figure 3:
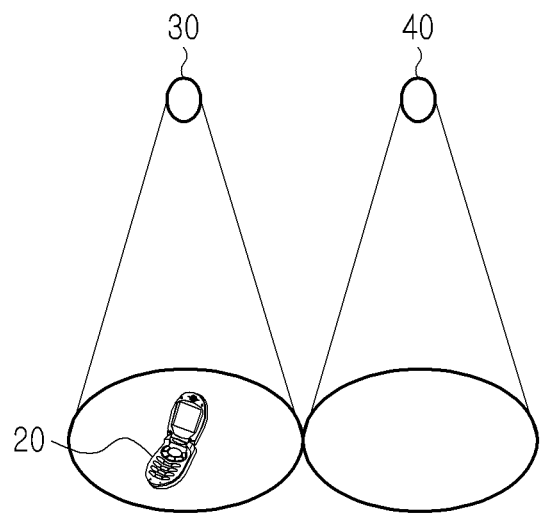
Figure 4:
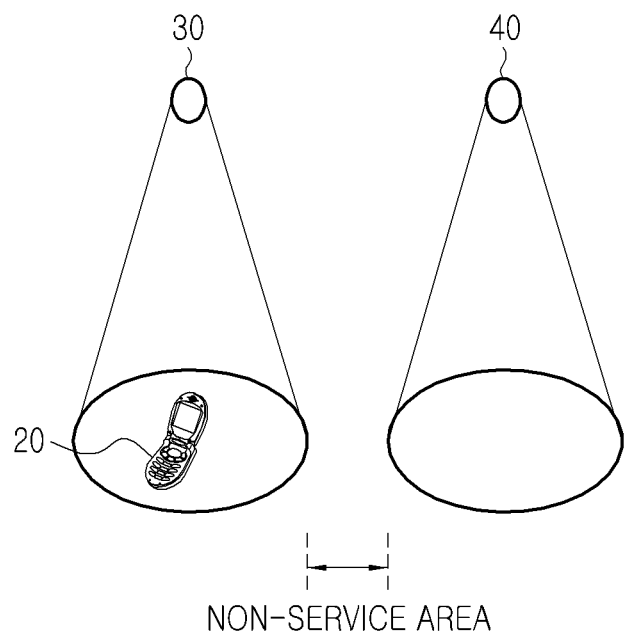

Various embodiments of the present invention will now be described in detail with reference to the accompanying drawings. The following detailed description includes specific details in order to provide a thorough understanding of these embodiments of the present invention. However, it will be apparent to those skilled in the art that the present invention may be practiced without such specific details. In the following description of the present invention, a detailed description of known functions and configurations incorporated herein will be omitted when it may obscure the subject matter of the present invention.

In accordance with an embodiment of the present invention, a method is provided for generating a visible frame in a VLC system. A VLC device, i.e., a transmitter, determines a visible frame output scheme according to various communication environments using VLC terminals, illumination or infrastructure. The VLC device transmits the determined visible frame output scheme to a counterpart VLC device, i.e., a receiver. The VLC device of the receiver receives and confirms the visible frame output scheme. The VLC devices of the transmitter and receiver communicate with each other. If the VLC device of the receiver is permitted to output the visible frame, the VLC device of the receiver generates the visible frame.

The visible frame output schemes may include a scheme in which only a transmitter generates a visible frame, a scheme in which only a receiver generates the visible frame, a scheme in which both the transmitter and receiver generate the visible frame, and a scheme in which neither the transmitter nor the receiver uses the visible frame. The visible frame may be generated when neither the transmitter nor the receiver transmits data, when a link is misaligned while the transmitter and receiver are communicating with each other, or when a NACK signal occurs due to a data problem during the communication between the transmitter and receiver.

In a Peer-to-Peer (P2P) environment of a unicast type, a large amount of power is used to transmit a visible frame in a VLC device. However, if the visible frame is selectively transmitted in order to conserve power, extended data communication between VLC devices will be possible.

When generating a visible frame while a transmitter and a receiver do not transmit data, a VLC device other than a VLC device which receives data using time slot allocation transmits the visible frame in a Virtual Local Area Network (VLAN) environment of a unicast, multicast, or broadcast type. Such transmission of the visible frame serves as interference with respect to a VLC device performing data communication.

Namely, a VLC device transmits the visible frame at time slots that are not allocated thereto and the transmission of the visible frame interferes with other VLC devices that are performing data communication. Basically, visible frames increase in proportion to the number of VLC devices in a system. Accordingly, as the number of VLC devices increases, the number of visible frames also increases, thereby increasing interference.

In a VLAN environment, if there is only one VLC receiver, the VLC receiver operates as a unicast type and a VLC transmitter and the VLC receiver can perform data communication using a visible frame without any interference. However, if two or more VLC receivers are present, the visible frame is should be selectively transmitted.

Figure 5:
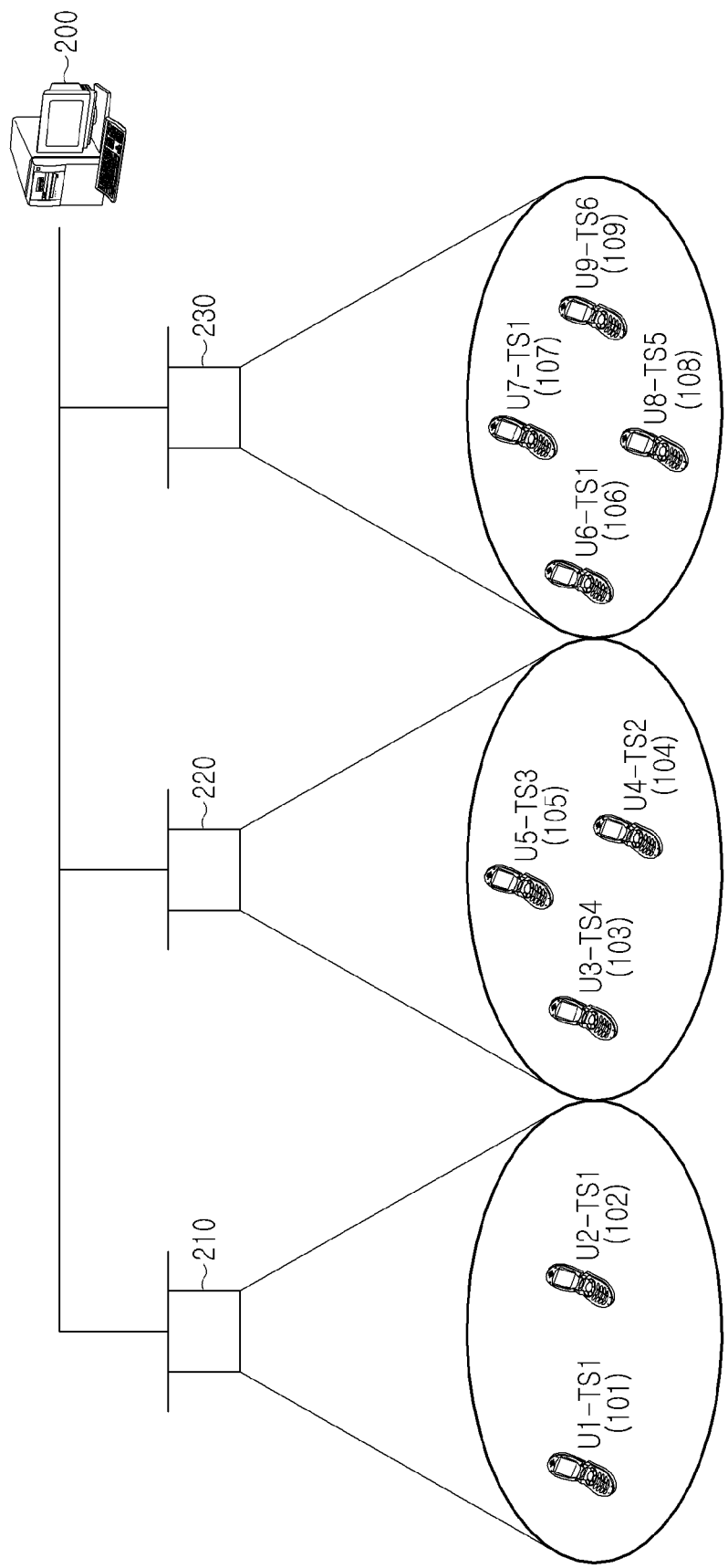
FIG. 5 illustrates a VLC system according to an embodiment of the present invention.

FIG. 5 illustrates a VLC system according to an embodiment of the present invention.

Referring to FIG. 5, the VLC system supporting multiple communication modes includes a VLC device 200 (or VLC transmitter) performing VLC through one or more light sources 210, 220 and 230 and includes VLC terminals (or VLC receivers) 101, 102, 103, 104, 105, 106, 107, 108, and 109 each having a visible light transceiver for transmitting and receiving a visible light signal.

The multiple VLC terminals 101 to 109 transmit and receive data using time slots, such as uplink time slots and downlink time slots, allocated thereto by the VLC device 200.

More specifically, the first and second VLC terminals 101 and 102 communicate with the first light source 210 using a first time slot TS1, the third VLC terminal 103 communicates with the second light source 220 using a fourth time slot TS4, the fourth VLC terminal 104 communicates with the second light source 220 using a second time slot TS2, the fifth VLC terminal 105 communicates with the second light source 220 using a third time slot TS3. The sixth and seventh VLC terminals 106 and 107 communicate with the third light source 230 using the first time slot TS1, the eighth VLC terminal 108 communicates with the third light source 230 using a fifth time slot TS5, and the ninth VLC terminal 109 communicates with the third light source 230 using a sixth time slot TS6.

Each of light sources 210, 220 and 230 has a unique light source IDentification (ID) and transmits data received from the VLC device 200 to the VLC terminals 101 to 109 located in its respective service area. The light sources 210, 220, and 230 transmit uplink data received from the VLC terminals 101 to 109 to the VLC device 200, and periodically broadcast frame synchronization so that the VLC terminals 101 to 109 located in their service areas are synchronized therewith.

The VLC device 200 constructs a cell including any light source according to a user service to be provided by the light source and allocates a time slot, i.e., an uplink time slot or a downlink time slot, according to the user service to be provided in each cell, data, and a user located in each cell.

Figure 6:
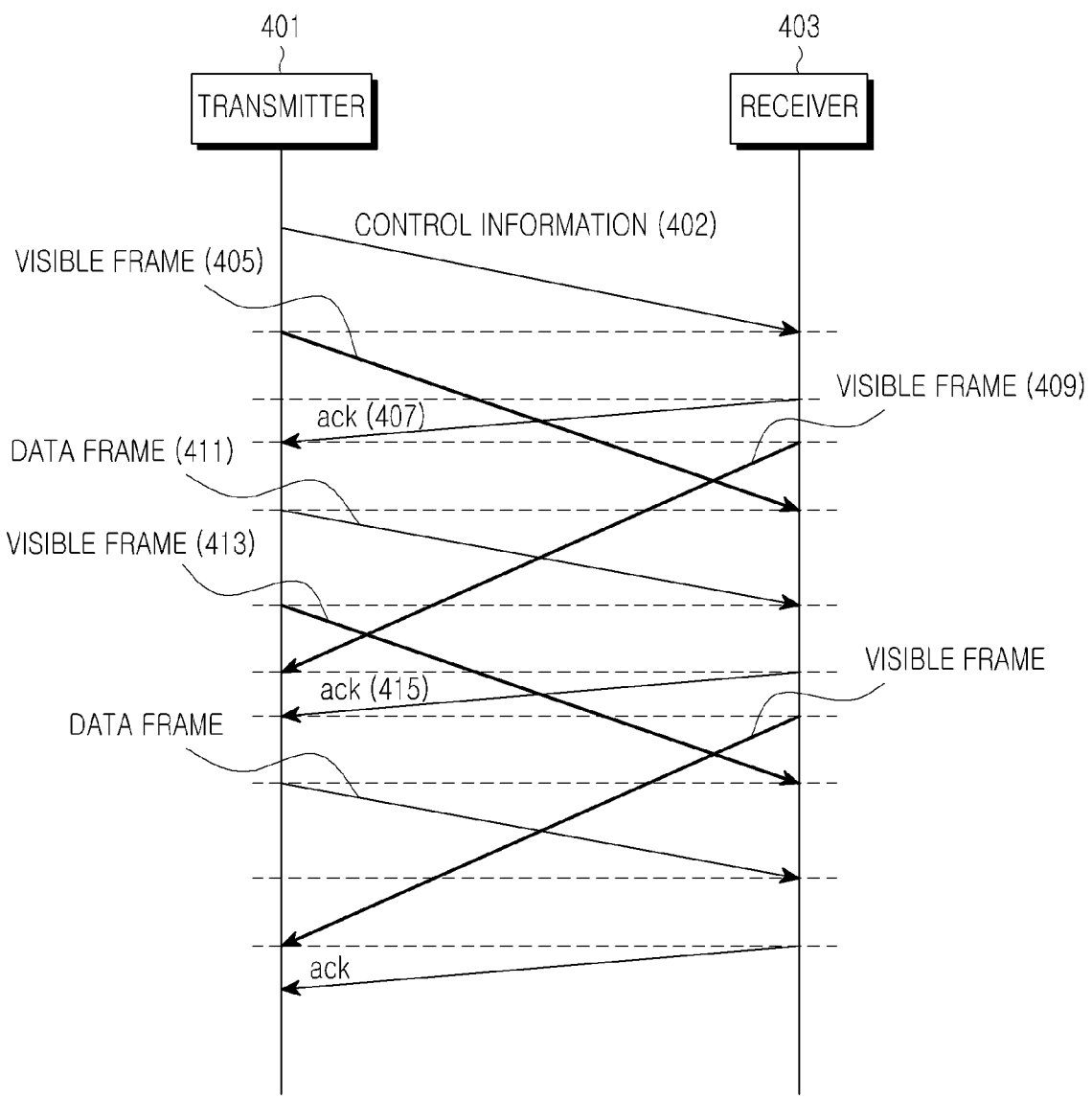
FIG. 6 is a signal flow diagram illustrating a method for transmitting a visible frame between a VLC transmitter and a VLC receiver.

FIG. 6 is a signal flow diagram illustrating a method for transmitting a visible frame between a VLC transmitter and a VLC receiver.

Referring to FIG. 6, the transmitter 401 and the receiver 403 set up a link for communication and then the transmitter 401 transmits control information 402 and a visible frame 405 to the receiver 403. The receiver 403 transmits an ACKnowledgement (ACK) signal 407 to the transmitter 401 in response to the received control information 402. Although not illustrated, the transmitter 401 continues to transmit the visible frame 405 to the receiver 403, until it transmits a data frame 411.

The receiver 403 transmits a visible frame 409 to the transmitter 401, after transmitting the ACK signal 407. The receiver 403 continues to transmit the visible frame 409 to the transmitter 401, until it transmits the ACK signal 415 in response to the reception of the data frame 411.

As described above, the transmitter 401 and the receiver 403 transmit the visible frames, except when transmitting the data frame or the ACK signal, thereby ensuring the visibility of a VLC system. Namely, because the intensity of a light source of the VLC system decreases, and thus the visibility of the VLC system is low during an information or data non-transmission interval, it may be possible to evenly maintain brightness by transmitting the visible frame. Furthermore, because the transmitter and receiver of the VLC system operate in a Line-of-Sight (LOS) communication environment, a visible frame may be transmitted even during misalignment of a transmitter and receiver or upon occurrence of a NACK signal for the data transmission of the transmitter and receiver.

However, because the visible frame, which is not related to data is transmitted during a data non-transmission interval, energy consumption of a terminal may increases.

FIG. 7 illustrates a VLC system using virtual time slots for accommodating multiple users. Specifically, FIG. 7 illustrates a VLC system for providing services to multiple users by dividing a communication frame into time slots in order to accommodate multiple users, whereby the visible frame is transmitted during a data non-transmission interval, creating interference with another terminal user.

Referring to FIG. 7, the VLC system is connected to an access point 503 and communicates using a network, i.e., provides a network accessible service through VLC in a VLC device 501. Alternatively, the VLC device 501 may be a system equipped with a transceiver for performing VLC.

Assuming that there are user terminals U1, U2, U3, U4, U5, and U6, which are accessible to a network using the VLC device 501, a first area 509 is a light source area of a cell unit, which can perform VLC. Each of the user terminals in the first area 509 is connected to the VLC device 501 at a virtual time slot (vs), which is a communication time allocated thereto.

Although not illustrated, the VLC device 501 includes a visible light transceiver for transmitting and receiving a visible light signal, and a controller for determining a visible frame output scheme considering a VLC environment and for controlling the visible light transceiver to transmit the visible frame output scheme to a counterpart VLC device, e.g., user terminals U1, U2, U3, U4, U5, and U6.

For VLC, time slots are allocated to the respective terminals based on a communication frame 507 used in the VLC system.

A second area 505 is a multicast communication environment, in which terminals U1, U2, and U3 communicate with a light source using one time slot 'vs n'. When the terminals U4, U5, and U6 communicate using time slots 'vs n+1', 'vs n+2', and 'vs n+n' of the communication frame 507, respectively, the VLC device 501 transmits the visible frame output scheme in consideration of interference with other user terminals. For example, the visible frame may be transmitted when a transmitter and a receiver do not transmit data, when the transmitter and receiver are misaligned, or when the transmitter and receiver generate a NACK signal.

After multiple user terminals in the second area 505 perform communication using the same time slot 'vs n', if the terminal U4 using the next time slot 'vs n+1' performs communication, the terminals in the second area 505 transmit a visible frame and thus may cause interference with the terminal U4. Namely, the transmission of the visible frame by the multiple terminals in the second area 505 under the state that the VLC device 501 transmits data to the terminal U4 at the time slot 'vs n+1' generates uplink interference with respect to the user terminal U4 and interrupts communication of the terminal U4.

In the above-described process, the terminals U5 and U6, which do not participate in communication at a time slot during which the terminal U4 performs communication, transmit the visible frame, like the terminals in the area 505. As the number of terminals in a cell increases, the amount of interference also increases. When the VLC device 501 provides a downlink service to the terminal U5 at the next time slot 'vs n+2', the terminals in the second area 505 using the time slot 'vs n', the terminal U4 using the time slot 'vs n+1', and the terminal U6 using the time slot 'vs n+n' do not transmit data and transmit the visual frame in an uplink direction, thereby generating communication interference with the terminal U5.

The above-described method for transmitting the visible frame, when no data is transmitted, has a disadvantage because uplink interference increases in proportion to the number of user terminals transmitting the visible frame. Further, when the terminal U1 generates a NACK signal or in a misaligned state while the multiple terminals in the second area 505 perform communication using the same time slot, the VLC device 501 should transmit the visible frame to the terminal U1, but does not need to transmit the visible frame to the other user terminals U2 and U3. Therefore, a method for transmitting the visible frame according to a VLC environment is demanded.

Table 1 is for determining a visible frame transmission scheme in a visible communication environment.

TABLE 1

| Transmission of Visible Frame | No data transmission | | | Misalignment | | | Nack | | |
|---|---|---|---|---|---|---|---|---|---|
| | UCAST | MCAST | BCAST | UCAST | MCAST | BCAST | UCAST | MCAST | BCAST |
| Transmitter | non-use | non-use | non-use | non-use | non-use | non-use | non-use | non-use | non-use |
| Receiver | non-use | non-use | non-use | use | use | use | use | use | use |
| Transmitter/ Receiver | non-use | non-use | non-use | non-use | non-use | non-use | non-use | non-use | non-use |
| Transmission Prohibition | use | use | use | use | use | use | use | use | use |

Referring to Table 1, when no data is transmitted in a VLC system that communicates on a time slot basis, because the transmission of the visible frame creates interference with respect to other users, it may be desirable not to transmit the visible frame. Further, the transmission of the visible frame when no data is transmitted increases the power consumption of a terminal. Accordingly, in a communication system based on a time slot, transmission prohibition of the visible frame may be applied when no data is transmitted.

In a communication system using an illumination environment, when a transmitter and a receiver are misaligned or generate a NACK signal, because a light source does not have an illumination effect according to an on/off phenomenon of light caused by the transmission of the visible frame, a light source of a transmitter should be limited not to transmit the visible frame. For misalignment of the transmitter and receiver, the transmission of the visible frame is limited for unicast (UCAST), multicast (MCAST), and broadcast (BCAST) to reduce interference with respect to other terminals. The transmission prohibition of the visible frame may be applied in any VLC environment.

Therefore, in accordance with an embodiment of the present invention, in a VLC system using illumination, a receiver is controlled to or not to transmit the visible frame.

A VLC system using P2P may have a construction for transmission between terminals and for infrastructure, such as a kiosk. Because a kiosk system is an infra system, which can be constructed using P2P, interference with other users should be considered when transmitting a visible frame.

Table 2 below shows a method for transmitting a visible frame according to a communication environment.

Because a kiosk system can communicate with other users using infra, the transmission of the visible frame is not permitted in consideration of interference with other users, but the visible frame may be transmitted in P2P. The transmission of the visible frame when no data is transmitted in a communication environment between terminals using P2P increases the power consumption of a terminal and thus a method for reducing the power consumption of the terminal using the transmission limitation of the visible frame is required.

Therefore, in accordance with an embodiment of the present invention, the transmission of the visible frame is selectively applied according to a communication environment as shown in Table 2.

TABLE 2

| Transmission of Visible Frame | | No Data Transmission | | Misalignment | | Nack | |
|---|---|---|---|---|---|---|---|
| | | UCAST | BCAST | UCAST | BCAST | UCAST | BCAST |
| Transmitter | Infra | non-use | non-use | non-use | non-use | non-use | non-use |
| | P2P | use/ non-use | non-use | use | non-use | use | non-use |
| Receiver | Infra | non-use | non-use | use | use | use | non-use |
| | P2P | use | non-use | use | non-use | use | non-use |
| Transmitter/ Receiver | Infra | non-use | non-use | non-use | non-use | non-use | non-use |
| | P2P | use/ non-use | non-use | use | non-use | use | non-use |
| Transmission Limitation | Infra | use | use | use | use | use | use |
| | P2P | use | non-use | use | non-use | use | non-use |

In P2P, when a transmitter transmits data to a receiver, if the receiver does not transmit data and therefore transmits a visible frame, the visible frame causes interference during a data transmission interval of the transmitter. As illustrated in FIG. 7, when a transmitter 513 transmits a data frame to a receiver 515, the receiver 515 transmits a visible frame because it does not transmit data.

However, because the visible frame transmitted by the receiver 515 is transmitted while the transmitter 513 transmits the data frame to the receiver 515, the visible frame is an interference source with respect to the data frame transmitted by the transmitter 513.

In P2P, the transmission of the visible frame may be selected according to a user and a communication environment. Because the transmission of the visible frame while data is not transmitted in P2P may generate interference, the transmitter and receiver may determine a method for transmitting the visible frame to perform effective communication. Accordingly, frames as illustrated in FIG. 8 may be used to transmit information, that is, a visible frame transmission scheme, indicating whether to use the visible frame.

Figures 8A, 8B:
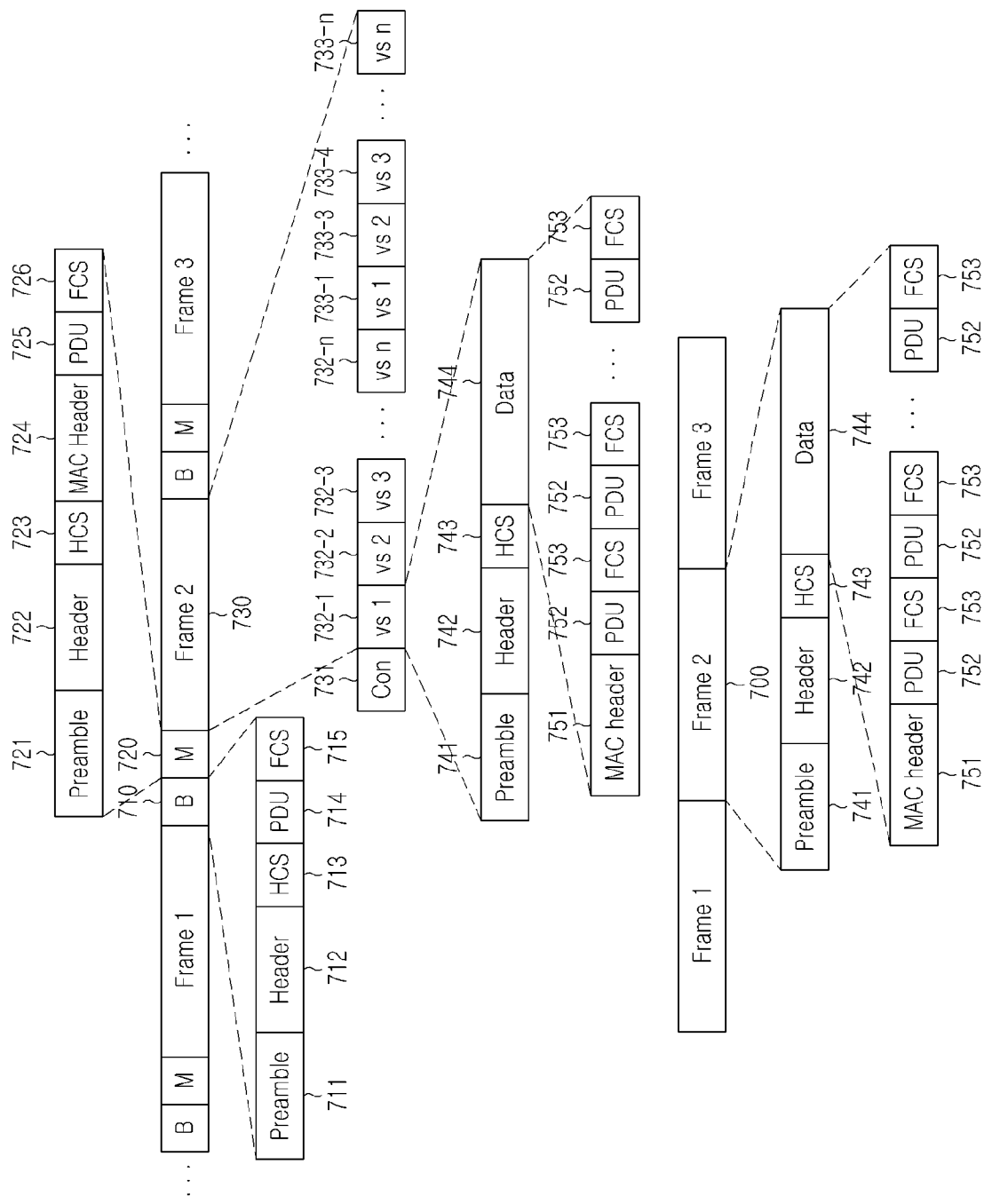
FIGS. 8A and 8B illustrate frame structures used in VLC according to an embodiment of the present invention.

FIGS. 8A and 8B illustrate frame structures used in VLC according to an embodiment of the present invention. Specifically, FIG. 8A illustrates a frame structure of a time slot allocation scheme for multiple users in VLC according to an embodiment of the present invention, and FIG. 8B illustrates a simplified form of the frame structure illustrated in FIG. 8A, when communication is performed in a unicast communication mode.

Referring to FIG. 8A, a frame used for VLC according to an embodiment of the present invention includes a beacon (B) field 710 having information for the synchronization and frame interpretation of a transmitter and a receiver, a management (M) field 720 having management information for VLC, and a data frame 730 having data.

The beacon field 710 includes a preamble 711, a header 712, a Header Check Sequence (HCS) 713, a Protocol Data Unit (PDU) 714, and a Frame Check Sequence (FCS) 715. The preamble 711 includes information for determining whether a VLC frame is to perform communication using a plurality of time slots. Accordingly, a receiver receiving the VLC frame may check the preamble 711 of the beacon field 710 when receiving the frame. If time slots are not used, the receiver interprets the frame as a frame as illustrated in FIG. 8B.

The management field 720 includes a preamble 721, a header 722, an HCS 723, a Medium Access Control (MAC) header 724, a PDU 725, and an FCS 726. The MAC header 724 includes mode type information indicating whether a communication mode is a unicast mode, a broadcast mode, or a multicast mode, and information indicating a visible frame output device.

The data frame 730 includes a contention slot 731, downlink virtual slots 732-1, . . . , 732-n, and uplink virtual slots 733-1, . . . , 733-n. The virtual slots 732-1, . . . , 732-n and 733-1, . . . , 733-n are individually allocated to a plurality of users during an operation of a communication mode as a multicast or broadcast mode.

Each of the virtual slots 732-1, . . . , 732-n and 733-1, . . . , 733-n includes a preamble 741, a header 742, an HCS 743, and a data field 744. The data field 744 includes a MAC header 751, and pairs of a plurality of PDUs 752 and a plurality of FCSs 753.

Referring to FIG. 8B, i.e., a VLC frame in a unicast communication mode, for example, in P2P communication, includes a preamble 741, a header 742, an HCS 743, and a data field 744. The header 742 includes information about a visible frame transmission scheme. The data field 744 includes a MAC header 751, and pairs of a plurality of PDUs 752 and a plurality of FCSs 753.

Figure 9:
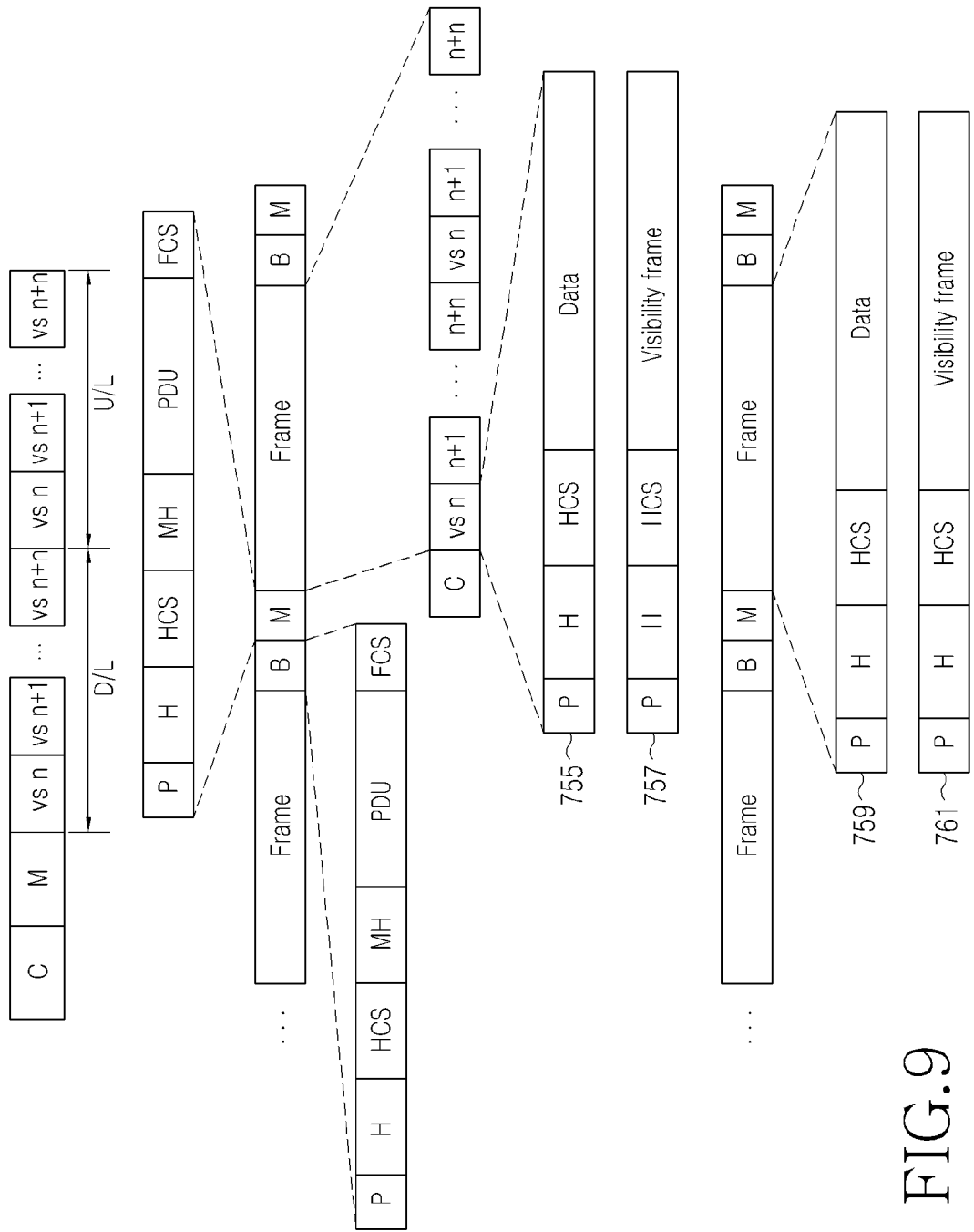
FIG. 9 illustrates a frame structure for applying Table 1 and Table 2 to the frame structures of FIG. 8 according to an embodiment of the present invention.

FIG. 9 illustrates a frame structure for applying Table 1 and Table 2 to frame structures as illustrated in FIGS. 8A and 8B according to an embodiment of the present invention.

Figure 10:
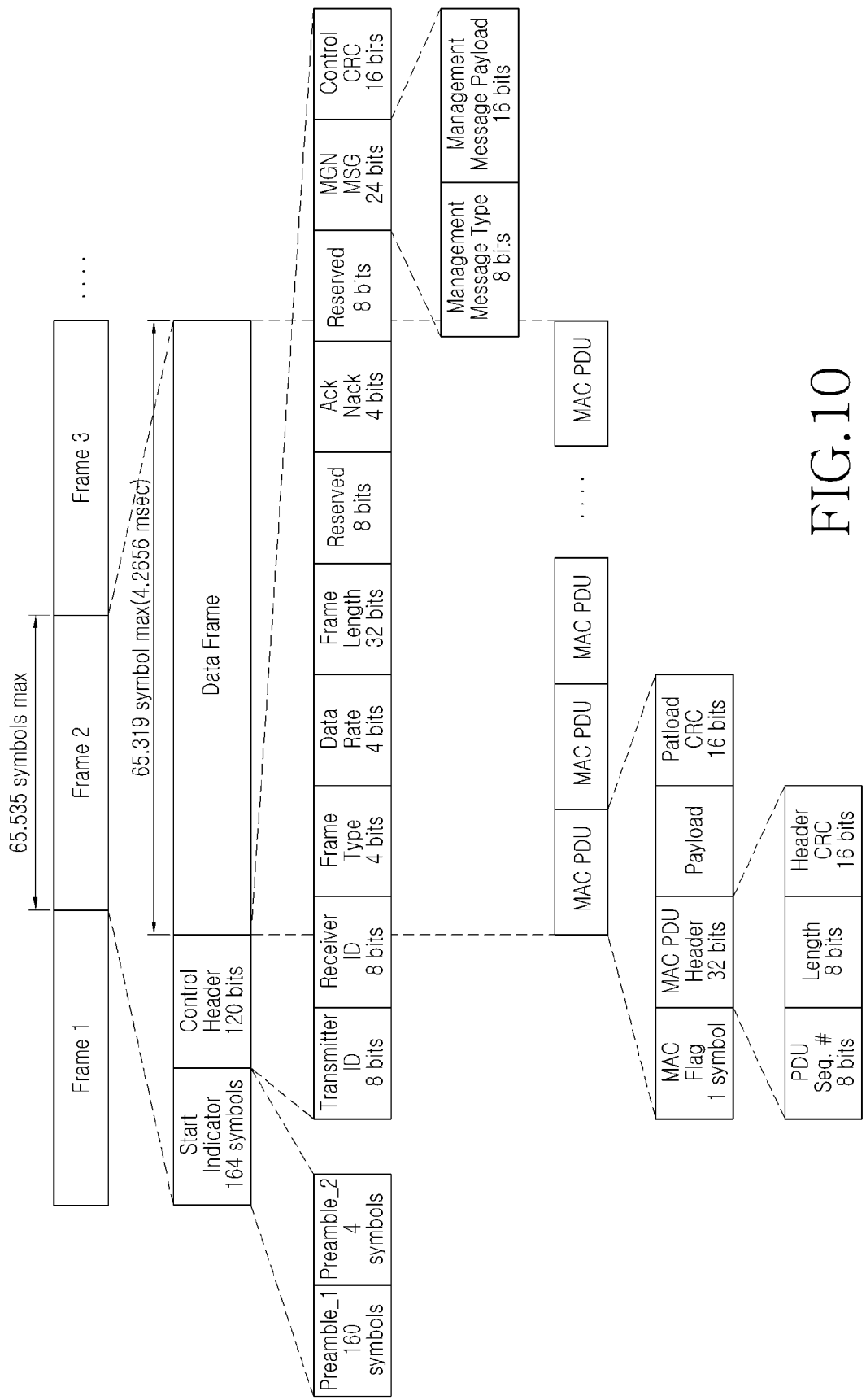
FIG. 10 illustrates a data frame as illustrated in FIG. 9 according to an embodiment of the present invention.
Figure 11:
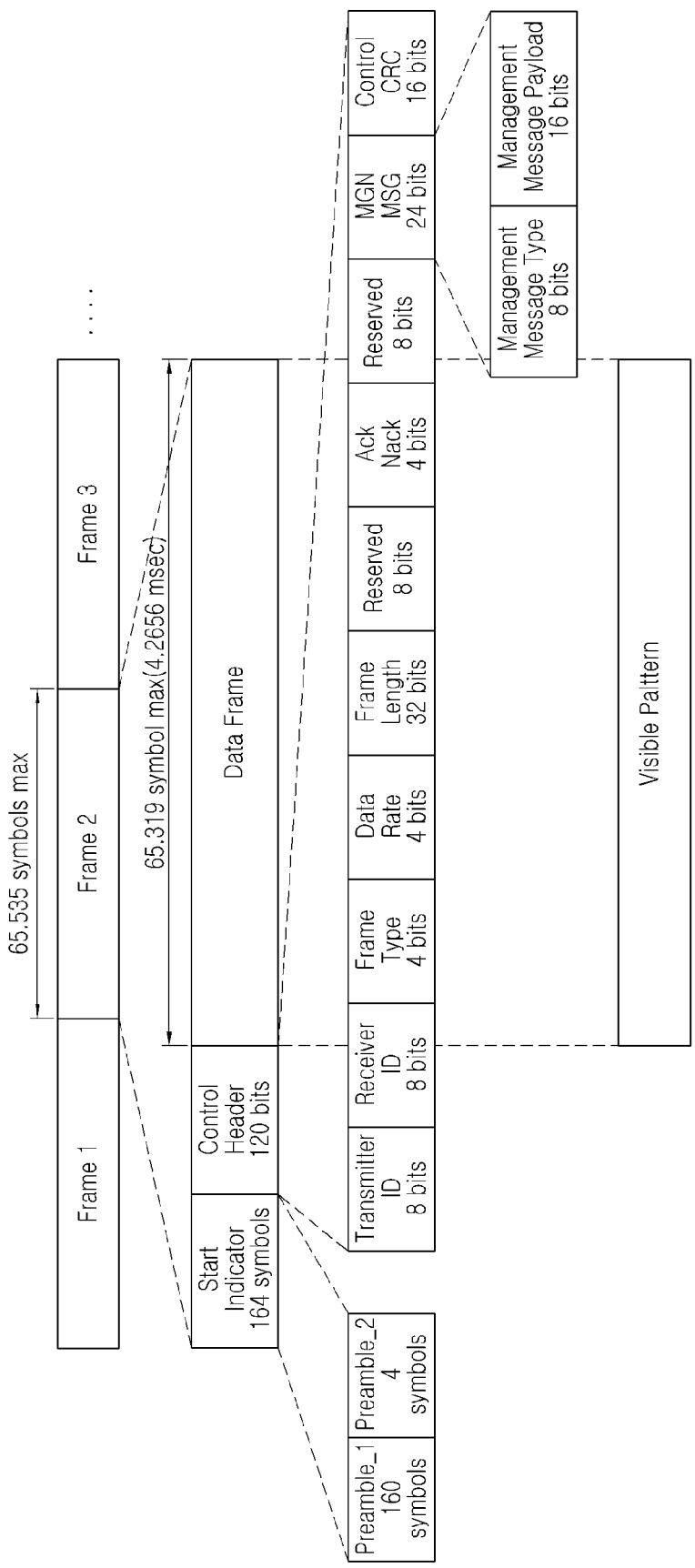
FIG. 11 illustrates a visible frame as illustrated in FIG. 9 according to an embodiment of the present invention.

FIG. 10 illustrates a detailed structure of a data frame as illustrated in FIG. 9, and FIG. 11 illustrates a detailed structure of a visible frame as illustrated in FIG. 9.

Referring to FIG. 9, frames 755 and 757 are frames showing a method for applying the visible frame described in Table 1 by dividing a frame into time slots to support multiple users. A terminal to which a time slot is allocated should reduce interference with other users by transmitting a visible frame during the allocated time slot. If the visible frame is transmitted while no data is transmitted, because interference between terminals occurs as a result of the transmission of the visible frame at non-allocated time slots, in accordance with an embodiment of the present invention, a method is provided for transmitting the visible frame in consideration of a communication environment.

In FIG. 9, the visible frame transmission scheme described in Table 2 is shown. As in frames 759 and 761, a visible frame is transmitted over the entire transmission frame. In this case, because the length of the visible frame is long, the transmission of visible frame at an interval during which a terminal does not transmit data increases the dissipated power of the terminal. Therefore, the selective transmission of the visible frame is used.

FIGS. 10 and 11 have the same usage as FIGS. 8A and 8B. Specifically, FIG. 10 illustrates a frame that is divided into time slots allocated to multiple user terminals, and FIG. 11 illustrates a frame that is not divided into time slots and may be applied to a communication environment such as P2P.

According to an embodiment of the present invention, in a P2P environment of a unicast type, if any one VLC device determines a visible frame transmission scheme indicating whether to permit the transmission of a visible frame and transmits the determined visible frame transmission scheme, a VLC device receiving the determined visible frame transmission scheme uses or does not use the visible frame at an interval during which data is not transmitted according to the determined visible frame transmission scheme.

In a VLAN environment using time slots, a receiving VLC device can use a visible frame only when a transmitting VLC device permits to transmit the visible frame. If there are a plurality of receiving VLC devices, brightness of visible frames may be adjusted to reduce interference. More specifically, as the number of receiving VLC devices within the cell increases, brightness of visible frames may be adjusted lower.

FIG. 12 illustrates visible frame patterns transmitted within a visible frame according to an embodiment of the present invention.

Referring to FIG. 12, in each pattern, '%' indicates brightness of the pattern. As '%' increases, the brightness of the visible frame increases and the power consumption of a terminal also increases. When the visible pattern within the visible frame is constructed as illustrated in FIG. 12, a visible pattern '11111 11111' provides the brightest pattern. Basically, brightness depends on how many 1s the visible frame has.

As shown in Table 1 and Table 2, if a visible frame transmission scheme at an interval during which data is not transmitted is applied to a time slot frame communication service considering multiple users, for example, a VLAN communication service, a frame pattern of high brightness generates more interference than a frame pattern of low brightness. If multiple terminals use visible frames, the sum of outputs of visible frames transmitted by the terminals appears in a light source, and therefore interference is increased.

As illustrated in FIG. 7, if the terminals in the second area 505 transmit visible frames while they do not transmit data at a time slot allocated to other terminals, because the sum of brightness of the visible frames at the time slot allocated to other terminals functions as interference with respect to other terminals, the amount of interference increases. Such uplink interference due to the visible frames transmitted by the terminals in the second area 505 operates as visible frame reflection interference with respect to the user terminals U4, U5, and U6.

A VLC system uses one of the visible frame patterns illustrated in FIG. 12. As the frame pattern approximates to '11111 11111', the strength of light increases, the power consumption of a terminal increases, and interference with other user terminals is increases in a VLC environment using time slots.

Accordingly, in a VLC environment having multiple users in a cell, a visible frame pattern having low brightness may be allocated during the transmission of a visible frame, thereby reducing interference.

As shown in Table 1, a VLC system that divides a frame into time slots for multiple users, interference is reduced and simultaneously the power consumption of a terminal is decreased by lowering the brightness of a visible frame pattern. More specifically, multiple user terminals within a VLC cell that transmit visible frames while data is not transmitted may reduce interference with a terminal, which is transmitting and receiving data, by adjusting brightness of each terminal. Such a brightness adjustment method may be also applied in a P2P communication environment mode.

In FIG. 12, '%' of each visible frame pattern denotes the brightness of the pattern. A visible frame pattern '00000 00000' does not mean that no visible frames are transmitted. The visible frame pattern '00000 00000' is filled in the visible frame 761 illustrated in FIG. 9 and is transmitted together with the management frame 720. This is different from the transmission of the visible frame being limited. Namely, the limitation of the visible frame indicates that the visible frame is not transmitted. The visible frame pattern '00000 00000' illustrated in FIG. 12 represents the transmission of the visible frame having low brightness.

When many terminal users are present in a VLC cell, a visible frame pattern '11001 11100' may be used. When the number of terminals is small and only P2P is considered, a visible frame pattern '11111 11111' having high brightness may be transmitted to effectively reduce interference.

When a visible frame is applied in a communication environment as shown in Table 1, low brightness from bits '0101 0000' to '0000 0000' is applied to a multi-terminal communication mode. When interference between terminals is low or no interference occurs, high brightness from bits '0110 0100' to '0101 1010' is applied to a P2P communication mode.

In FIG. 12, an application mode of the visible frame may vary according to a communication environment. Accordingly, a visible pattern having low brightness while reducing interference may be applied to reduce the power consumption of a terminal.

While the brightness adjustment method has been described to reduce interference with other terminals, a method for selectively transmitting a visible frame may be used to reduce the power consumption of terminals using a power saving mode or a sleep mode and to reduce interference with other terminals during the transmission of the visible frame in a VLC system.

When applying a visible frame pattern, brightness may be expressed as an ID or a bit as illustrated in FIGS. 14 and 15. Namely, brightness of 100% may be expressed as ID 1 (0001), brightness of 90% as ID 1 (0010), brightness of 80% as ID 1 (0011), brightness of 70% as ID 1 (0100), brightness of 60% as ID 1 (0101), brightness of 50% as ID 1 (0110), brightness of 40% as ID 1 (0111), brightness of 30% as ID 1 (1000), brightness of 20% as ID 1 (1001), brightness of 10% as ID 1 (1010), and brightness of 0% as ID 1 (1011).

Figure 13:
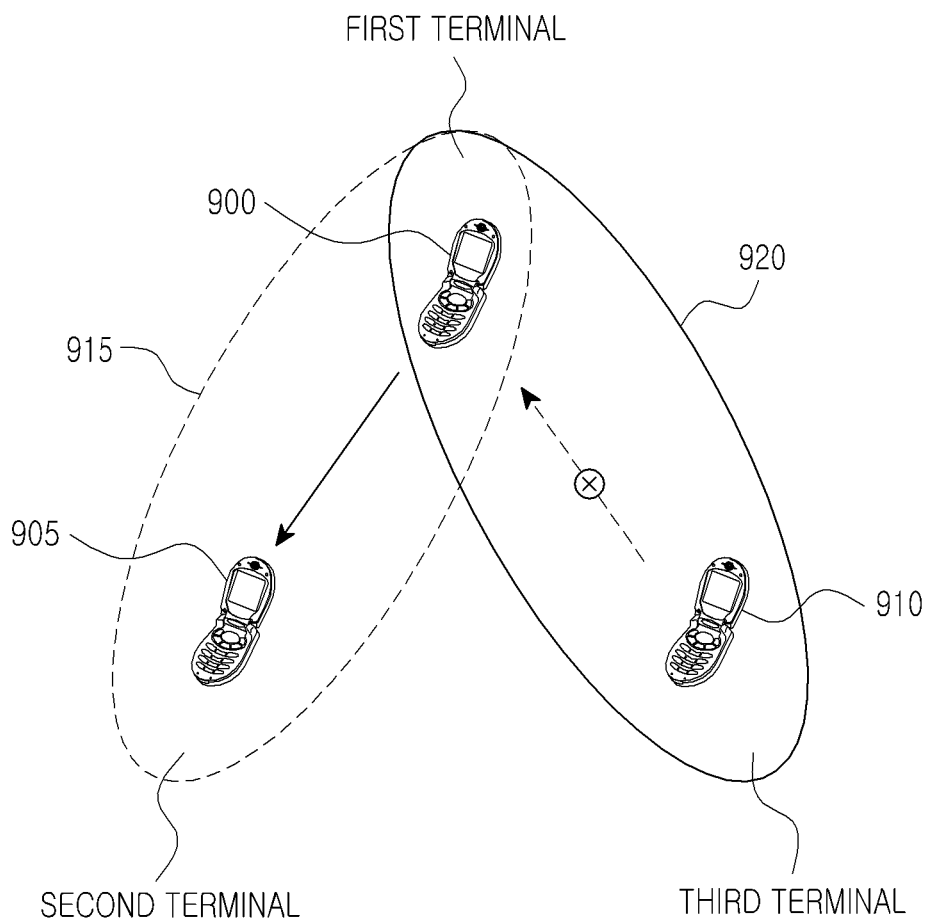
FIG. 13 illustrates multiple simultaneous association according to an embodiment of the present invention.

FIG. 13 illustrates multiple simultaneous association according to an embodiment of the present invention. Specifically, in FIG. 13, multiple simultaneous association refers to P2P communication denoted by reference numerals 915 and 920 performed by a terminal 900 with two or more terminals 905 and 910.

Referring to FIG. 13, when the first terminal 900 transmits and receives data with the second terminal 905, if the third terminal 910 transmits a visible frame, interference occurs in a link between the first and second terminals 900 and 905. In such a multiple simultaneous association environment, the first terminal 900 may designate the transmission of visible frames of the second and third terminals 905 and 910. That is, the first terminal 900 may select the transmission of visible frames of the second and third terminals 905 and 910 using a field 'VF info type' as illustrated in FIGS. 14, 15, and 16. That is, it is possible to selectively transmit the visible frame.

The 'VF info type' information set by the first terminal 900 is applied to the second terminal 905 and has no relation to the transmission of the visible frame of the first terminal 900, which is a transmitter. Accordingly, although the first terminal 900 transmits the visible frame, the second terminal 905 may or may not transmit the visible frame according to the 'VF info type' information set by the first terminal 900. However, even though the first terminal 900 does not transmit the visible frame, the second terminal 905 may or may not transmit the visible frame according to the 'VF info type' set by the first terminal 900. Thus, because the second terminal 905 determines whether to transmit the visible frame according to the 'VF info type' information, irrespective of whether the first terminal 900 transmits the visible frame, the second terminal 905 is not required to recognize whether the first terminal 900 of a transmitter transmits the visible frame.

The above selective visible frame transmission method reduces uplink interference generated when a communication service is provided to multiple users using time slots and reduces power consumption.

FIGS. 14 to 17 illustrate frame structures according to embodiments of the present invention.

Specifically, FIG. 14 illustrates control header information according to an embodiments of the present invention. In data transmission and reception between the first and second terminals 900 and 905, a transmitter ID denotes an ID of a terminal, which transmits data. If the first terminal 900 transmits data, an ID of the first terminal 900 is set as the transmitter ID, and an ID of the second terminal 905 is set as a receiver ID. The terminal transmitting data may use the selective visible frame transmission method.

In FIG. 14, a frame length corresponds to a length for the transmission of a visible frame. When considering resource allocation in units of time slots, a visible frame should be used according to time slots instead of using the entire visible frame as shown in frames 759 and 761 in FIG. 9.

In FIG. 14, a visible frame pattern may vary according to a communication environment, as illustrated in FIG. 12, or a fixed visible frame pattern may be used. A visible information type 'VF info type' is set to one bit and indicates whether to permit a terminal receiving data to transmit a visible frame. For example, when the second terminal 905 receives data from the first terminal 900, as illustrated in FIG. 13, if the visible frame information type 'VF info type' is set to 1, the second terminal 905 recognizes that the transmission of a visible frame to the first terminal 900 is permitted and transmits the visible frame at an interval during which the second terminal 905 does not transmit data to the first terminal 900. If the visible frame information type 'VF info type' is set to 0, the second terminal 905 recognizes that the transmission of the visible frame to the first terminal 900 is prohibited and does not transmit the visible frame.

Although FIG. 14 provides an example using the visible frame information type of one bit to indicate whether to permit a terminal receiving data to transmit the visible frame, it is apparent that various modifications to the visible frame information type are possible.

For example, the visible frame information type of 2 bits expressed as 10, 01, 11, and 00 may be designated to indicate methods in which only a transmitter uses a visible frame, only a receiver uses the visible frame, both the transmitter and receiver use the visible frame, and the visible frame is not used, respectively.

FIGS. 16 and 17 illustrate frame structures for use by a transmitter and a receiver, respectively, according to embodiments of the present invention. Specifically, FIG. 16 illustrates a downlink frame, and FIG. 17 illustrates an uplink frame in the time slot structure in which a transmitter uses a downlink and a receiver uses an uplink as illustrated in FIG. 8A.

FIGS. 16 and 17 may be applied to a frame structure in which the uplink and downlink are not divided, as illustrated in FIGS. 14 and 15. Further, FIGS. 14 to 17 may be applied to beacon information, control information, and information about a Mobile Station (MS) ID (user terminal ID) or a specific user.

FIG. 18 illustrates a frame structure according to an embodiment of the present invention. Specifically, FIG. 18 illustrates a frame structure showing another application of FIG. 14, i.e., a structure of the management field 720.

Referring to FIG. 18, the frame structure defines a frame length, a frame pattern, and a visible frame information type and shows a method for variously applying a visible frame. MS ID may be optional. For example, when the first terminal 900 and the second terminal 905 communicate with each other, because they are able to know their counterpart, the MS ID may be unnecessary. However, when the first terminal 900 communicates with the third terminal 910 while communicating with the second terminal 905, the MS ID for identifying each terminal may be necessary. Accordingly, the MS ID may be designated in consideration of such a case.

Figure 19:
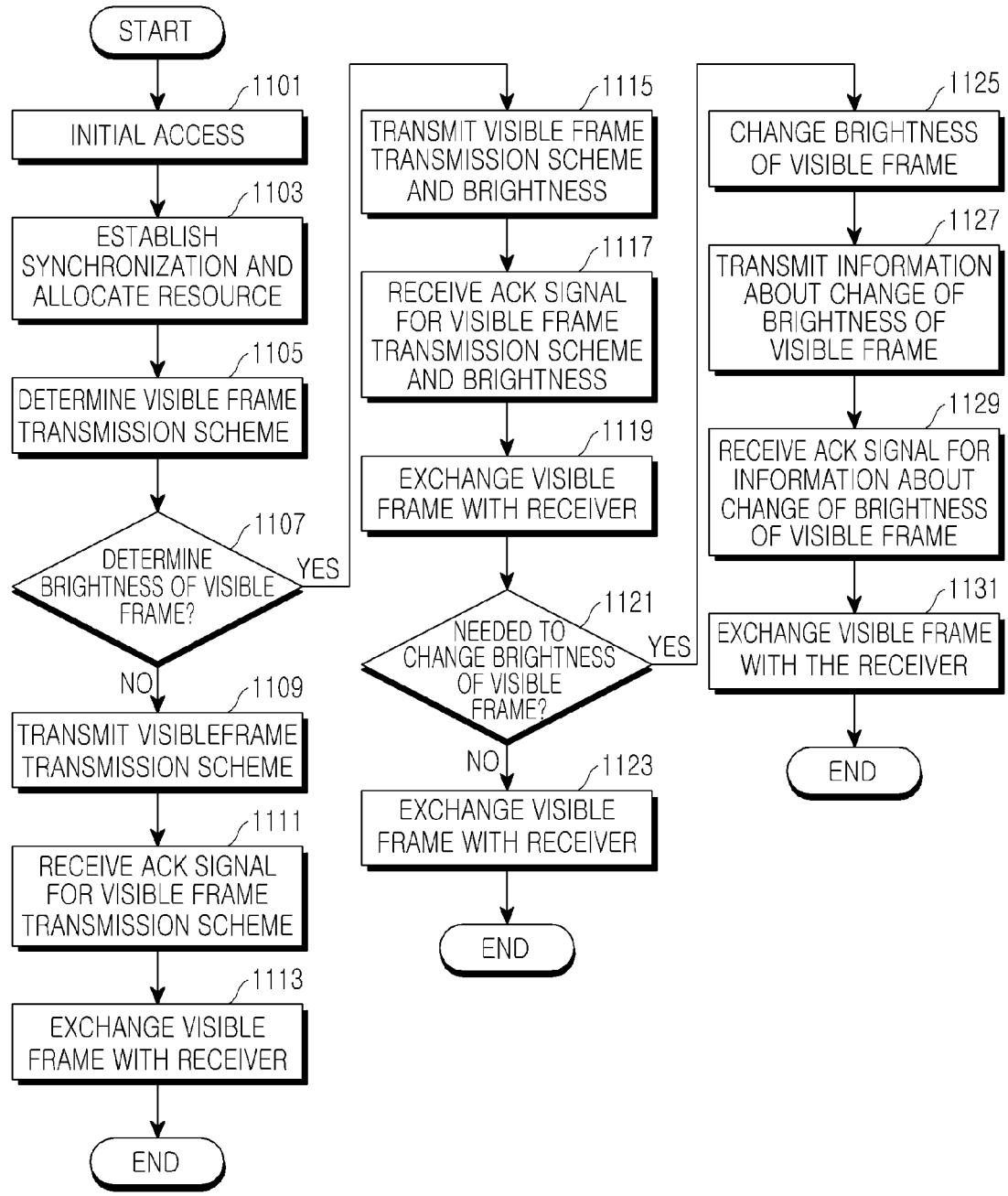
FIG. 19 is a flow chart illustrating an operation of a VLC transmitter according to an embodiment of the present invention.

FIG. 19 is a flow chart illustrating an operation of a transmitter according to an embodiment of the present invention.

Referring to FIG. 19, a receiver initially accesses a transmitter in step 1101. The transmitter and receiver are synchronized and a transmitter allocates time slot resources for communication in step 1103. The transmitter determines a visible frame transmission scheme in step 1105. Specifically, the transmitter determines whether the transmitter is to transmit the visible frame, the receiver is to transmit the visible frame, both the transmitter and receiver are to transmit the visible frame, or neither the transmitter and no the receiver is to use the visible frame. The above process may be determined by a terminal user or by the transmitter according to a VLC environment (illumination, P2P, infra, etc.).

In step 1107, the transmitter determines whether to determine brightness of the visible frame. Specifically, the transmitter determines whether to use fixed brightness of the visible frame or a variable brightness according to a communication environment during the transmission of the visible frame. When the transmitter determines not to determine brightness of the visible frame, e.g., if the fixed brightness is used, the transmitter transmits the visible frame transmission scheme to the receiver in step 1109 without considering the brightness type. The transmitter receives an ACK signal for the visible frame transmission scheme from the receiver in step 1111 and exchanges the visible frame with the receiver in step 1113.

However, if the transmitter determines that the brightness of the visible frame should be changed according to a communication environment in step 1107, the transmitter determines visible frame brightness according to a current communication environment and transmits the visible frame transmission scheme and the determined visible frame brightness to the receiver in step 1115. The transmitter receives an ACK signal for the visible frame transmission scheme and visible frame brightness from the receiver in step 1117. The transmitter exchanges the visible frame with the receiver in step 1119. In step 1121, the transmitter determines whether there is need of changing the brightness of the visible frame, e.g., due to interference caused by an increase of users in a VLC environment or other reasons.

If the transmitter determines that the brightness of the visible frame should be changed, the transmitter changes the brightness of the visible frame in step 1125 and transmits information about a change of the brightness of the visible frame to the receiver in step 1127. The transmitter receives an ACK signal for the information about a change of the brightness of the visible frame from the receiver in step 1129. The transmitter exchanges the visible frame with the receiver in step 1131.

However, if there is no need to change the brightness of the visible frame in step 1121, the transmitter exchanges the visible frame with the receiver using the previous brightness of the visible frame in step 1123.

Figure 20:
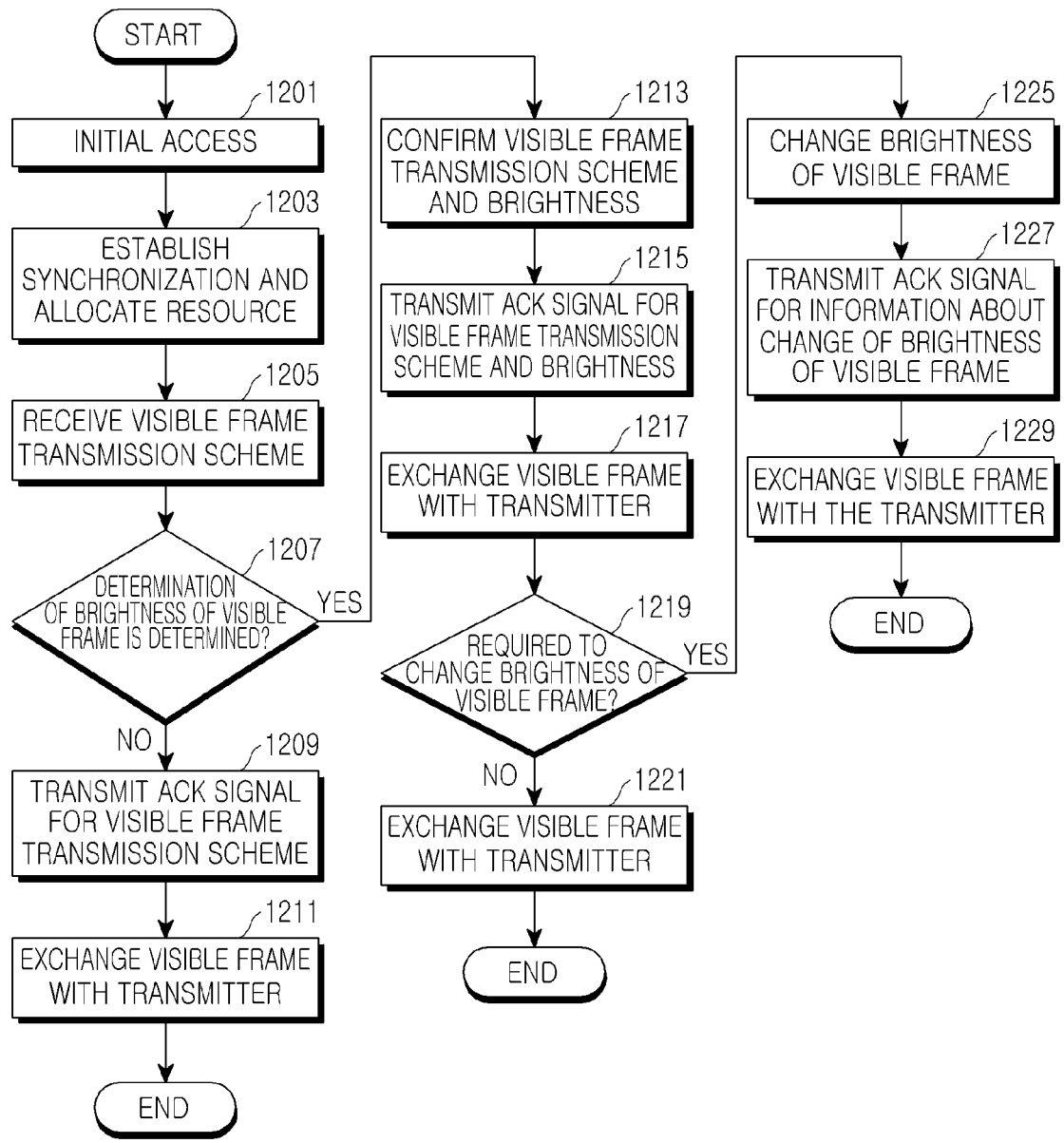
FIG. 20 is a flow chart illustrating an operation of a VLC receiver according to an exemplary embodiment of the present invention.

FIG. 20 is a flow chart illustrating an operation of a receiver according to an embodiment of the present invention.

Referring to FIG. 20, a receiver initially accesses a transmitter in step 1201. The transmitter and receiver are synchronized and the receiver receives allocated time slot resources for communication in step 1203.

In step 1207, the receiver determines whether the transmitter determines the brightness of the visible frame. Specifically, the receiver determines whether to use the brightness of the visible frame e.g., if variable brightness is used in the transmitter during the transmission of the visible frame according to a communication environment. When the transmitter does want to use the brightness of the visible frame, e.g., if fixed brightness is used, the receiver transmits an ACK signal for the visible frame transmission scheme to the transmitter in step 1209 and exchanges the visible frame with the receiver in step 1211.

However, when the transmitter wants to use the brightness of the visible frame, e.g., if variable brightness is used, in step 1207, the receiver confirms the brightness of the visible frame in step 1213, transmits an ACK signal for the visible frame transmission scheme and visible frame brightness from the receiver in step 1215, and exchanges the visible frame with the transmitter in step 1217.

In step 1219, the receiver determines whether it is required to change the brightness of the visible frame, e.g., due to interference caused by an increase of users in a VLC environment or other reasons.

If the brightness of the visible frame should be changed, the receiver changes the brightness of the visible frame in step 1225, transmits an ACK signal for the information about changing the brightness of the visible frame in step 1227, and exchanges the visible frame with the transmitter in step 1229.

However, if there is no need to change the brightness of the visible frame in step 1219, the receiver exchanges the visible frame with the transmitter using the previous brightness of the visible frame in step 1221.

The information about changing the visible frame and the information about selecting the brightness of the visible frame use the visible frame patterns illustrated in FIGS. 9 to 17, as described above.

In the description above, a brightness adjustment method has been made for reducing interference generated when the transmitter permits the receiver to transmit the visible frame in a VLC environment of a time slot scheme. Hereinafter, a process for determining a visible frame transmission scheme and performing communication according to the determined visible frame transmission scheme will be described when a terminal communicates with another terminal in one-to-one communication, as illustrated in FIG. 13.

Figure 21:
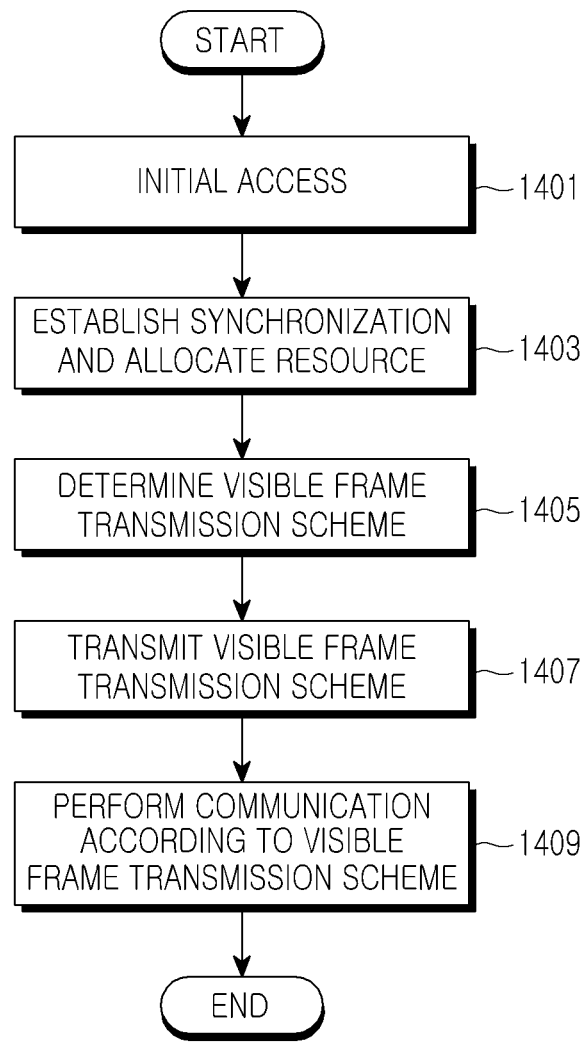
FIG. 21 is a flow chart illustrating an operation of a VLC transmitter according to an embodiment of the present invention.
Figure 22:
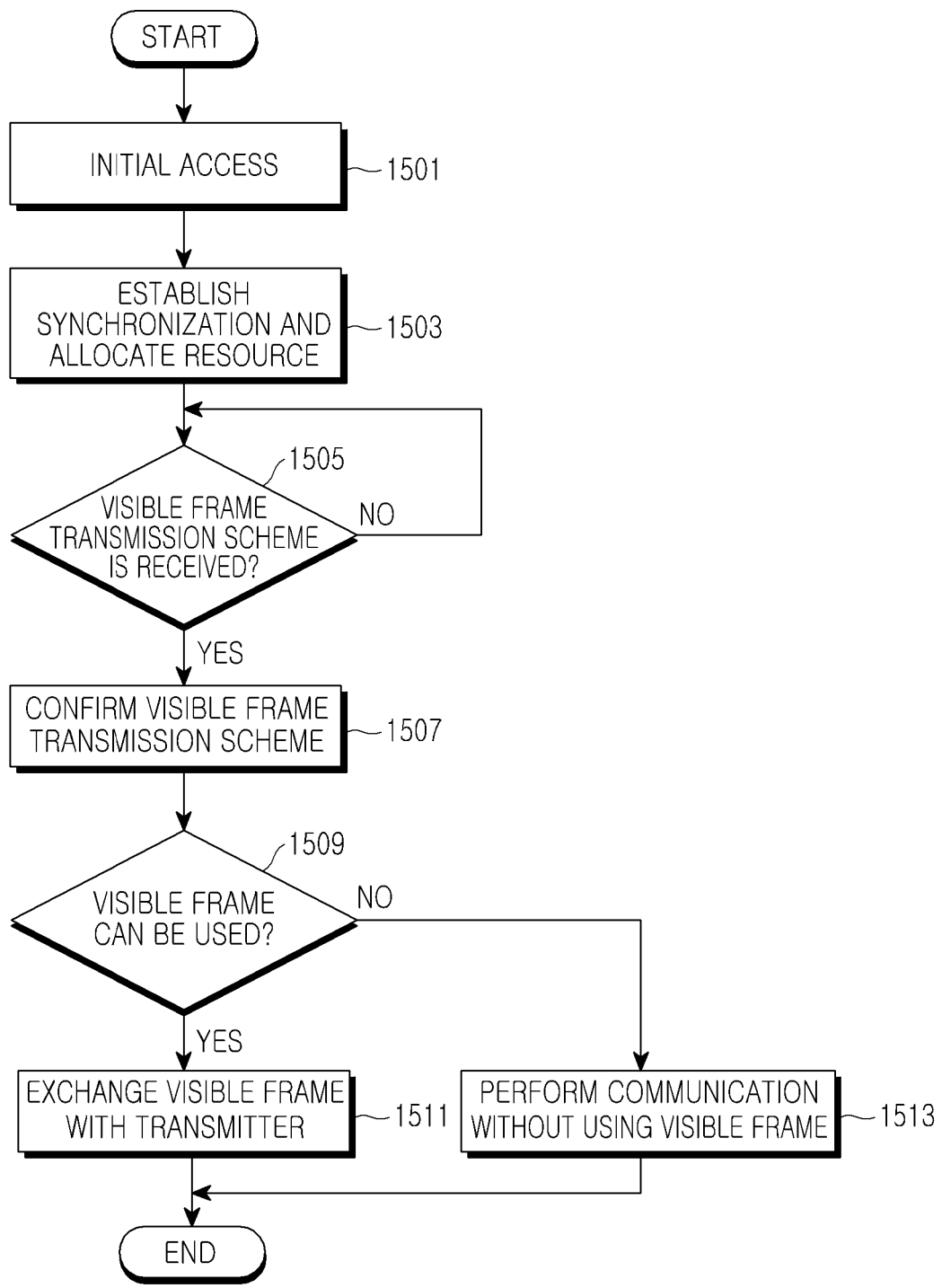
FIG. 22 is a flow chart illustrating an operation of a VLC receiver according to an embodiment of the present invention.

FIG. 21 is a flow chart illustrating an operation of a VLC transmitter according to an embodiment of the present invention, and FIG. 22 is a flow chart illustrating an operation of a VLC receiver according to an embodiment of the present invention. Specifically, FIG. 21 illustrates an operation of a VLC device for determining and transmitting a visible frame transmission scheme, and FIG. 22 illustrates an operation of the VLC device for receiving the determined visible frame transmission scheme and performing communication according to the received visible frame transmission scheme.

Referring to FIG. 21, steps 1401 to 1405 are the same as steps 1101 to 1105, as illustrated in FIG. 19. Accordingly, these steps will not be described again.

If the visible frame transmission scheme is determined, a transmitter transmits the visible frame transmission scheme to a receiver in step 1407 and performs communication according to the determined visible frame transmission scheme in step 1409. Namely, if the transmitter permits the receiver to transmit the visible frame, the transmitter receives the visible frame from the receiver while data is not transmitted. If the transmitter does not permit the transmission of the visible frame, the transmitter does not receive the visible frame irrespective of the transmission of data.

Referring to FIG. 22, steps 1501 to 1503 are the same as steps 1201 to 1203 as illustrated in FIG. 20. Accordingly, these steps will not be described again.

If the visible frame transmission scheme is received from the transmitter in step 1505, the receiver confirms the visible frame transmission scheme in step 1507, and determines whether it is possible to use the visible frame in step 1509. If the visible frame can be used, i.e., if the transmitter permits the receiver to transmit the visible frame, the receiver exchanges the visible frame with the transmitter in step 1511. However, if the transmitter does not permit the transmission of the visible frame, the receiver performs communication without using the visible frame in step 1513.

AS described above, an embodiment of the present invention can generate a visible frame for indicating a communication link alignment when a communication link is disconnected in a multimode VLC system of a unicast, broadcast, or multicast mode.

Specifically, when a communication link of one of multiple terminals receiving data through a time slot allocated from one light source is released in a broadcast or multicast communication mode, a terminal of a receiver informs a transmitter of a communication link release and generates a visible frame for communication link alignment, thereby performing communication link alignment without affecting communication of other terminals.

In a unicast mode such as P2P, both the transmitter and the receiver may generate a visible frame or only the receiver may generate the visible frame.

The VLC system of the present invention can effectively perform a unicast, broadcast, or multicast communication mode and can provide a communication service using VLC such as VLAN, Information Broadcasting (IB), P2P, Point-to-Multipoint (P2M), Vehicular Broadcasting (VB), etc.

Although certain embodiments of the present invention have been disclosed for illustrative purposes, various modifications, additions, and substitutions are possible, without departing from the scope and spirit of the invention as disclosed in the accompanying claims. Accordingly, the scope of the present invention should not be limited to the description of these embodiments, but is defined by the accompanying claims and any equivalents thereof.

The invention claimed is:

1. A method for controlling a first Visible Light Communication (VLC) device, the method comprising:
   determining whether to permit a second VLC device to transmit visible frames; and
   transmitting, to the second VLC device, a visible frame including a bit indicating whether the second VLC device is permitted to transmit the visible frames,
   wherein the bit is set to '0' or '1', wherein a value of the bit indicates that the second VLC device is permitted to transmit the visible frames or indicates that the second VLC device is not permitted to transmit the visible frames.

2. The method of claim 1, further comprising:
   determining a visible frame output scheme for two or more VLC devices when the first VLC device communicates with the two or more VLC devices in units of time slots;
   determining whether to permit the two or more VLC devices to transmit visible frames; and
   transmitting, to a VLC device to which a time slot is allocated, a visible frame including a bit indicating whether the two or more VLC devices are permitted to transmit the visible frames.

3. The method of claim 1, wherein the visible frame output scheme includes one of a scheme in which only the first VLC device transmits the visible frames, a scheme in which only the second VLC device transmits the visible frames, a scheme in which both the first and second VLC devices transmit the visible frames, and a scheme in which neither the first VLC device nor the second VLC device uses the visible frames.

4. The method of claim 2, further comprising:
   adjusting brightness of the visible frames for the two or more VLC devices, when the bit of the visible frame indicates that the two or more VLC devices are permitted to transmit the visible frames; and
   transmitting the visible frames with information about an adjusted brightness.

5. The method of claim 1, wherein the first VLC device is one of a device including a light source and a mobile terminal.

6. The method of claim 1, wherein the first VLC device and the second VLC device transmit visible frames when the devices are not transmitting data frames.

7. A method for determining visible frame output in a second Visible Light Communication (VLC) device, the method comprising:
   receiving, from a first VLC device, a visible frame including a bit indicating whether the second VLC device is permitted to transmit visible frames;
   confirming the bit in the received visible frame;
   determining whether to transmit the visible frames according to the bit of visible frame; and
   transmitting the visible frames when a value of the bit indicates that the second VLC device is permitted to transmit the visible frames,
   wherein the bit is set to '0' or '1', wherein the value of bit indicates that the second VLC device is permitted to transmit the visible frames or indicates that the second VLC device is not permitted to transmit the visible frames.

8. The method of claim 7, further comprising:
   confirming whether visible frame brightness information for two or more VLC devices is received, when a value of the bit indicates that the second VLC device is permitted to transmit the visible frames; and
   transmitting the visible frames by adjusting brightness of the visible frames based on the visible frame brightness information.

9. The method of claim 7, wherein the first VLC device and the second VLC device transmit visible frames when the devices are not transmitting data frames.

10. A Visible Light Communication (VLC) device for transmitting visible frames, the device comprising:
    a visible light transceiver for transmitting and receiving a VLC signal; and a controller for determining whether to permit a counterpart VLC device to transmit the visible frames, when the VLC operates as a transmitter, and transmitting, to the counterpart VLC device, through the visible light transceiver, a visible frame including a bit indicating whether the counterpart VLC device is permitted to transmit the visible frames, wherein the bit is set to a value of '0' or '1', wherein the value of the bit indicates that the counterpart VLC device is permitted to transmit the visible frames or indicates that the counterpart VLC device is not permitted to transmit the visible frames.

11. The VLC device of claim 10, wherein the controller determines a visible frame output scheme for two or more counterpart VLC devices when the VLC device communicates with the two or more counterpart VLC devices in units of time slots, determines whether to permit the two or more counterpart VLC devices to transmit visible frames, and transmits, to a VLC device to which a time slot is allocated, a bit indicating whether the two or more counterpart VLC devices are permitted to transmit the visible frames.

12. The VLC device of claim 10, wherein the visible frame output scheme includes one of a scheme in which only the VLC device transmits the visible frames, a scheme in which only the counterpart VLC device transmits the visible frames, a scheme in which both the VLC device and the counterpart VLC device transmit the visible frames, and a scheme in which neither the VLC device nor the counterpart VLC device use the visible frames.

13. The VLC device of claim 11, wherein the controller adjusts brightness of the visible frames for the two more counterpart VLC devices, when a value of the bit indicates that the two or more counterpart VLC devices are permitted to transmit the visible frames, and transmits information about an adjusted brightness.

14. The VLC device of claim 10, wherein the VLC device and the counterpart VLC device transmit visible frames when the devices are not transmitting data frames.

* * * * *